US010216848B2

(12) United States Patent
Zhang et al.

(10) Patent No.: US 10,216,848 B2
(45) Date of Patent: Feb. 26, 2019

(54) METHOD AND SYSTEM FOR RECOMMENDING CLOUD WEBSITES BASED ON TERMINAL ACCESS STATISTICS

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Shaorui Zhang, Beijing (CN); Haoyu Ning, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 772 days.

(21) Appl. No.: 14/411,463

(22) PCT Filed: May 21, 2013

(86) PCT No.: PCT/CN2013/075952
§ 371 (c)(1),
(2) Date: Dec. 26, 2014

(87) PCT Pub. No.: WO2014/000538
PCT Pub. Date: Jan. 3, 2014

(65) Prior Publication Data
US 2016/0188723 A1    Jun. 30, 2016

(30) Foreign Application Priority Data
Jun. 27, 2012  (CN) .......................... 2012 1 0216947

(51) Int. Cl.
*G06F 17/30* (2006.01)
*H04L 29/08* (2006.01)
(Continued)

(52) U.S. Cl.
CPC .... *G06F 17/30867* (2013.01); *G06F 17/3053* (2013.01); *G06F 17/3097* (2013.01);
(Continued)

(58) Field of Classification Search
None
See application file for complete search history.

(56) References Cited

U.S. PATENT DOCUMENTS 7,499,965 B1 *  3/2009  Chai ................. G06F 17/30864
                                                    709/202
7,774,470 B1 *  8/2010  Sanders ............. H04L 63/1483
                                                    709/219

(Continued)

FOREIGN PATENT DOCUMENTS

CN    101178728 A    5/2008
CN    101420452 A    4/2009
(Continued)

OTHER PUBLICATIONS

International Patent Application No. PCT/CN2013/075952; International Search Report; dated Aug. 22, 2013; 3 pages.

*Primary Examiner* — Aleksandr Kerzhner
*Assistant Examiner* — Giuseppi Giuliani
(74) *Attorney, Agent, or Firm* — Baker & Hostetler LLP

(57) ABSTRACT

The present invention discloses a method and system for recommending cloud websites based on terminal access statistics, wherein, the method mainly comprises: storing websites accessed by a terminal, and sorting the websites according to the accessed frequency by the terminal; capturing corresponding website descriptive information according to a website sorting result; storing the websites and corresponding descriptive information to a cloud storage medium; and when receiving a query request, querying the stored websites and corresponding website descriptive information according to the query keywords in the query request, returning a query result, and returning one or more websites whose frequency ranks on the top in the query result as recommended items. The present invention calculates the popularity of websites and sorts the websites based (Continued)

on the statistics about access behaviors, thereby significantly improving the quality and relevance of the recommended result.

17 Claims, 5 Drawing Sheets

(51) Int. Cl.
*G06Q 30/02* (2012.01)
*G06Q 30/06* (2012.01)

(52) U.S. Cl.
CPC ... *G06F 17/30864* (2013.01); *G06Q 30/0201* (2013.01); *G06Q 30/0631* (2013.01); *H04L 67/02* (2013.01); *H04L 67/10* (2013.01); *H04L 67/22* (2013.01)

(56) References Cited

U.S. PATENT DOCUMENTS

| | | | |
|---|---|---|---|
| 2011/0029555 A1* | 2/2011 | Gao | G06F 21/00 707/769 |
| 2011/0066607 A1* | 3/2011 | Wong | G06F 17/3053 707/706 |

FOREIGN PATENT DOCUMENTS

| | | |
|---|---|---|
| CN | 101551806 A | 10/2009 |
| CN | 102332020 A | 1/2012 |
| CN | 102761627 A | 10/2012 |
| WO | WO 2007/140685 A1 | 12/2007 |

* cited by examiner

METHOD AND SYSTEM FOR RECOMMENDING CLOUD WEBSITES BASED ON TERMINAL ACCESS STATISTICS

CROSS-REFERENCE TO RELATED APPLICATIONS

This application is the National Stage of International Application No. PCT/CN2013/075952, filed May 21, 2013, which claims the benefits of Chinese Patent Application No. 201210216947.7, filed Jun. 27, 2012, the disclosures of which are incorporated herein by reference in their entireties.

TECHNICAL FIELD

The present invention relates to the field of communication technology, and especially to a method, system and the related equipment for recommending cloud websites based on terminal access statistics.

BACKGROUND OF THE INVENTION

Website recommending technology refers to a technology of automatically recommending relevant websites upon inputting a part of a website address or description of a website by a user. This technology is applied in application scenes such as browser address bars, requiring to prompt websites the user might want to access as much as possible, or even to recommend those unknown but most appropriate to the user's demand.

At present, all the common browsers are provided with a function of recommending websites in the website bar. However, the data of the recommended websites in most browsers is from local cookies. This method has two problems in that, the websites which are not in cookies could not be recommended; and the cost for updating a website library is so high that the library could not be updated frequently. Since contents on the Internet change very frequently, it is difficult for this method to ensure the coverage and freshness of the website library.

A few browsers are able to support the function of recommending cloud websites in addition to recommending based on the local website library, and to query websites from cloud side in real time when the user is inputting and recommend a corresponding result. Compared with the recommendation based on the local website library, this method can ensure the coverage and accuracy of recommending websites. However, the existing browsers supporting this function are on the basis of a universal search engine, which uses a part of the website address or website descriptions input by the user to search in the universal search engine and recommends several top websites in the search result. Since target data of the universal search engine is web content which satisfies a requirement of the user on the query of text information, the computational algorithms of result relevance and result sorting are both designed for full-text query. But the target data of recommended websites in the browser website bar is website data, which satisfies a requirement of the user on quickly seeking websites. Thus, it is not appropriate to directly use the search results of search engines as the recommended websites, there is a problem of poor relevance and low quality, the efficiency of user in finding appropriate websites during use is low and the user's experience is not good.

SUMMARY OF THE INVENTION

In consideration of the aforementioned problems, the present invention is proposed so as to provide a method, system and the related equipment for recommending cloud websites based on terminal access statistics that will overcome above problems or at least solve or partially relieve above problems.

According to one aspect of the present invention, a system for recommending cloud websites based on terminal access statistics is provided, which comprises: a sorting unit, a capturing unit, a storage unit and a query processing unit, wherein, the sorting unit is configured to store websites accessed by a terminal, and sort the websites according to the accessed frequency by the terminal;

the capturing unit is configured to capture the corresponding website descriptive information according to a website sorting result;

the storage unit is configured to store the captured websites and the corresponding descriptive information to a cloud storage medium;

the query processing unit is configured to, when receiving a query request from a requestor, query the stored websites and corresponding website descriptive information according to the query keyword(s) in the query request, return a query result, and return one or more websites whose frequency ranks on the top in the query result as recommended items to the requestor According to another aspect of the present invention, a method for recommending cloud websites based on terminal access statistics is provided, which comprises steps of:

storing websites accessed by a terminal, and sorting the websites according to the accessed frequency by the terminal;

capturing corresponding website descriptive information according to a website sorting result;

storing the websites and corresponding descriptive information to a cloud storage medium; and when receiving a query request from a requestor, querying the stored websites and corresponding website descriptive information according to the query keyword(s) in the query request, returning a query result, and returning one or more websites whose frequency ranks on the top in the query result as recommended items to the requestor.

According to another aspect of the present invention, a device for processing website statistics is provided, which comprises a sorting unit, a capturing unit and a storage unit, wherein, the sorting unit is configured to store websites accessed by a terminal, and sort the websites according to the accessed frequency by the terminal;

the capturing unit is configured to capture corresponding website descriptive information according to a website sorting result;

the storage unit is configured to store the captured websites and the corresponding website descriptive information to a cloud storage medium.

According to another method of the present invention, a query device is provided, which comprises: an index building module configured to build an index according to the websites and the corresponding website descriptive information and creating an index file; and, a query module configured to call the index file to query, output the query result according to the keyword(s) in the query request, and return one or more websites whose frequency ranks on the top in the query result as the recommended items to the requestor.

According to another aspect of the present invention, a computer program is provided, which comprises computer readable codes, wherein a server executes the method for recommending cloud websites based on terminal access statistics according to any one of claims 12-22 when the computer readable code is operated on the server.

According to another aspect of the present invention, a computer readable medium is provided that stores the computer program according to claim 34.

The present invention calculates the popularity of websites and sorts websites based on the statistics on access behaviors, thereby significantly improving the quality and relevance of the recommended result.

The above descriptions are merely an overview of the technical solution of the present invention. In order to more clearly understand the technical solution of the present invention to implement in accordance with the contents of the specification, and to make the foregoing and other objects, features and advantages of the invention more apparent, detailed embodiments of the invention will be provided below.

BRIEF DESCRIPTION OF THE DRAWINGS

Through reading the detailed description of the following preferred embodiments, various further advantages and benefits will become apparent to an ordinary skilled in the art. Drawings are merely provided for the purpose of illustrating the preferred embodiments and are not intended to limit the present invention. Further, throughout the drawings, same elements are indicated by same reference numbers. In the drawings.

EMBODIMENTS

Hereafter, the present invention will be further described in connection with the drawings and the specific embodiments.

First, the method for recommending cloud websites based on terminal access statistics according to the embodiment of the present invention will be described in detail in conjunction with FIGS. 1 and 2.

Figure 1:
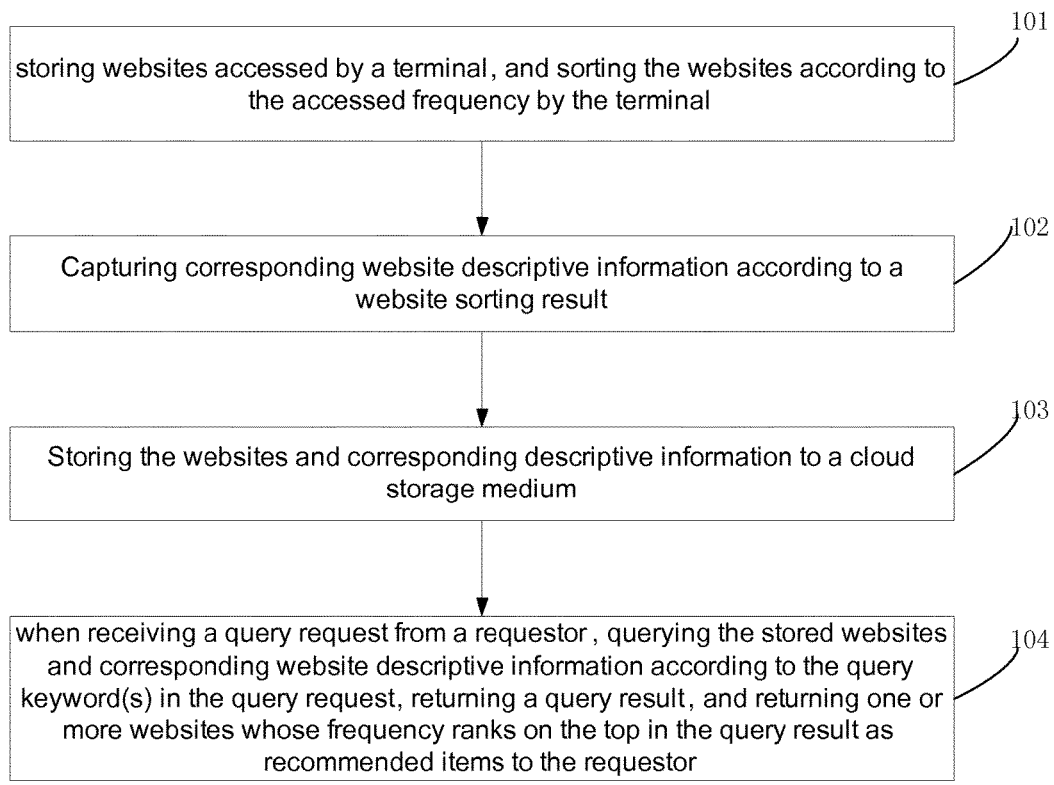
FIG. 1 is a schematic flow chart of a method for recommending cloud websites based on terminal access statistics according to the present invention.

As shown in FIG. 1, FIG. 1 is a flow chart of the method for recommending cloud websites based on terminal access statistics according to the embodiment of the present invention. The method may mainly comprise steps of:

Step 101: storing websites accessed by a terminal, and sorting the websites according to the accessed frequency by the terminal;

Step 102: capturing corresponding website descriptive information according to a website sorting result;

Step 103: storing the websites and corresponding descriptive information to a cloud storage medium; and Step 104: when receiving a query request from a requestor, querying the stored websites and corresponding website descriptive information according to the query keyword(s) in the query request, returning a query result, and returning one or more websites whose frequency ranks on the top in the query result as recommended items to the requestor.

Figure 2:
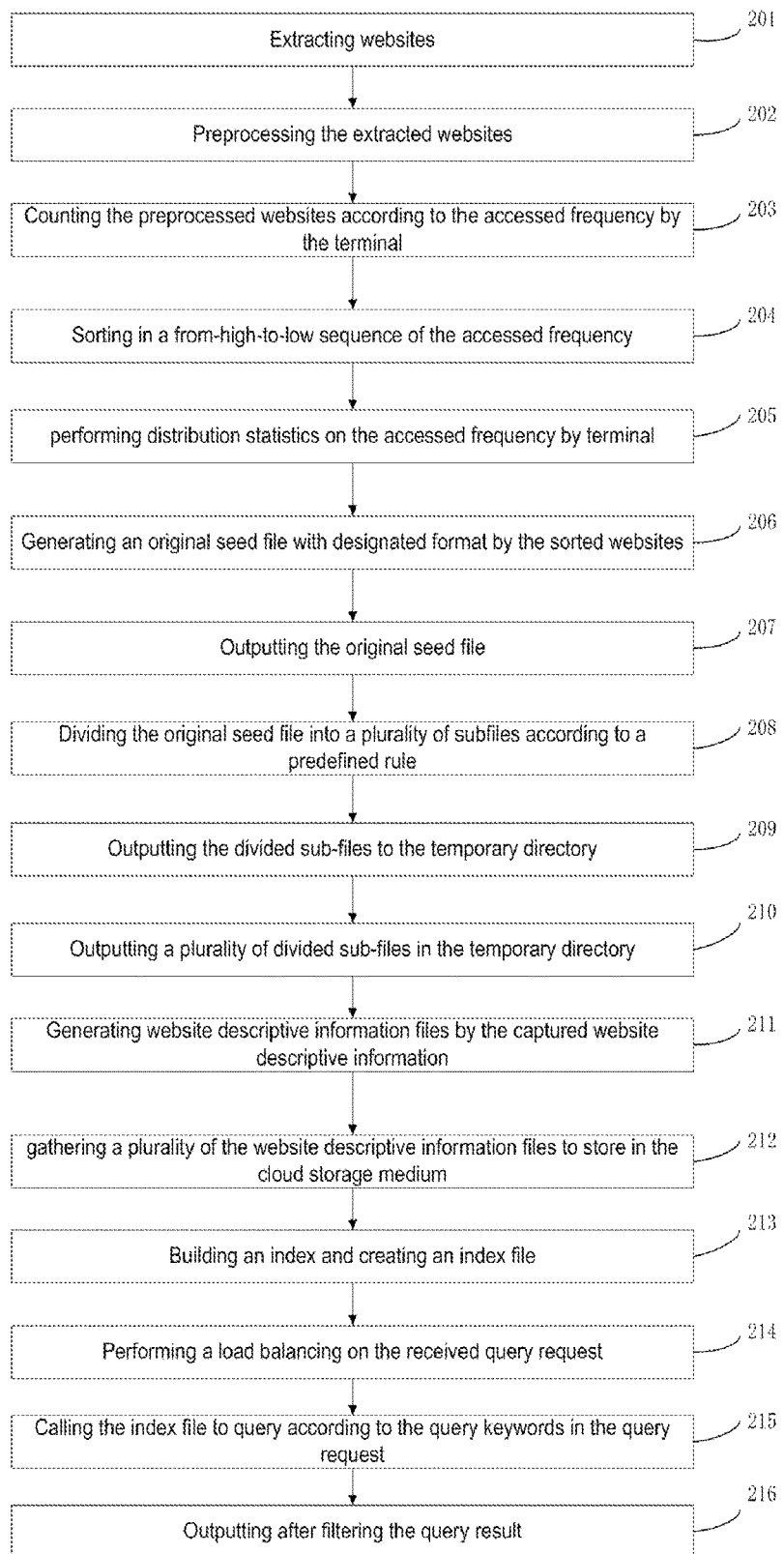
FIG. 2 is a specific flow chart of the method for recommending cloud websites based on terminal access statistics of the embodiment according to the present invention.

As shown in FIG. 2, FIG. 2 is a specific flow chart of the method for recommending cloud websites based on terminal access statistics according to the embodiment of the present invention. The method may mainly comprise steps of:

Step 201: extracting websites from a database storing the websites accessed by the terminal;

Step 202: preprocessing the extracted websites, the preprocessing comprising: filtering illegal websites and/or deleting repeated websites;

Step 203: counting the preprocessed websites according to the accessed frequency by the terminal;

Step 204: sorting in a from-high-to-low sequence of the accessed frequency;

Step 205: performing distribution statistics on the accessed frequency by the terminal (for example, domain names whose accessed frequency by the terminal ranges under 1000 times and domain names whose accessed frequency by the terminal ranges between 1000 and 2000 times);

Step 206: generating an original seed file with designated format by the sorted websites, the designated format being a kind of file format conforming to a requirement of subsequent capturing, eg. SMXL format;

Step 207: outputting the original seed file that contains a plurality of data records, each of which corresponds to one website;

Step 208: dividing the original seed file into a plurality of sub-files according to a predefined rule and storing them in a temporary directory, the predefined rule being MD5 algorithm and the process of dividing comprising: using the MD5 algorithm to calculate a MD5 value corresponding to a string of websites for each data record in the original seed file; then normalizing the MD5 value to an integer value, and using the integer value to calculate a remainder of a number of sub-files to be divided into, the obtained remainder being used as a serial number of the sub-file; and finally, writing the data record into the sub-file with a corresponding serial number; the embodiment of the present invention employing the MD5 algorithm to divide, but those skilled in the art understanding that the embodiment of the present invention may also be realized by other hash algorithm;

Step 209: outputting the divided sub-files to the temporary directory;

Step 210: outputting a plurality of divided sub-files in the temporary directory and waiting for the subsequent capturing process;

Step 211: capturing corresponding website descriptive information for each sub-file according to the websites recorded in the sub-file, generating website descriptive information files by the captured website descriptive information and storing the files;

Step 212: temporarily storing each website descriptive information file, and then gathering a plurality of the website descriptive information files to store in the cloud storage medium;

Step 213: building an index according to the websites and the corresponding website descriptive information and creating an index file;

Step 214: performing a load balancing on the received query request when receiving the query request from the requestor;

Step 215: for each query request, judging whether the keyword(s) in the query request is a website keyword or a descriptive keyword, if it is the website keyword, then calling the index file to query and filtering out the result not hit by a prefix, and if it is the descriptive keyword, then directly calling the index file to query; and Step 216: after filtering the query result, outputting one or more websites whose frequency ranks on the top in the query result as the recommended item(s), wherein the method of filtering is selected from one or more of the following:

Black and White List filtering, erotic content filtering, Trojan virus type filtering, phishing type filtering and politically sensitive information filtering, etc.

Next, the system for recommending cloud websites based on terminal access statistics according to the embodiment of the present invention will be described in detail in conjunction with FIG. 3.

Figure 3:
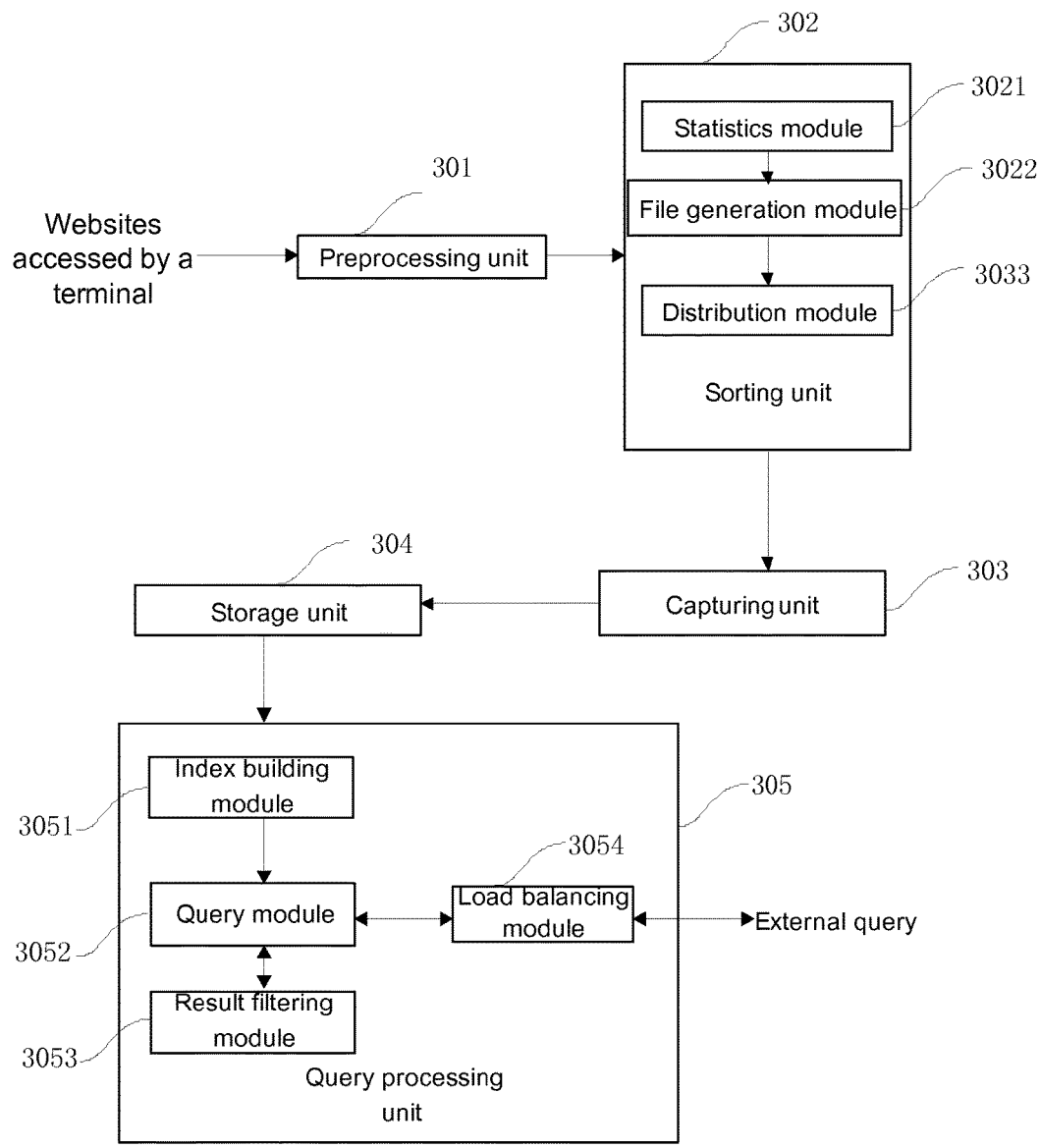
FIG. 3 is a structural diagram of a system for recommending cloud websites based on terminal access statistics of the embodiment according to the present invention.

As shown in FIG. 3, FIG. 3 is a structural diagram of the system for recommending cloud website based on the terminal access statistics according to the embodiment of the present invention. The system may particularly comprise: a preprocessing unit 301, a sorting unit 302, a capturing unit 303, a storage unit 304 and a query processing unit 305. Hereafter, the respective modules will be described in detail.

(1) The preprocessing unit 301, as a preferred functional module according to the embodiment of the present invention, is mainly used for extracting websites from a database storing the websites accessed by a terminal, and preprocessing the extracted websites and trigger the sorting unit 302, wherein, the preprocessing comprises: filtering illegal websites and/or deleting repeated websites.

(2) The sorting unit 302 is mainly used for sorting the websites according to the access frequency by the terminal.

The sorting unit 302 may particularly comprise: a statistics module 3021, a file generation module 3022, and a distribution module 3023, wherein, the statistics module 3021 is configured to perform statistics on the accessed frequency by the terminal and sort the websites in a from-high-to-low sequence of the accessed frequency;

the file generation module 3022 is configured to generate an original seed file with designated format by the sorted websites, the original seed file containing a plurality of data records, each of which corresponds to one website;

the distribution module 3023 is configured to divide the original seed file into a plurality of sub-files according to a predefined rule to respectively distribute to each capturing unit; wherein, the predefined rule may be MD5 algorithm, the distribution module using the MD5 algorithm to calculate a MD5 value corresponding to a string of websites for each data record in the original seed file; then normalizing the MD5 value to an integer value and using the integer value to calculate a remainder of a number of sub-files to be divided into, the obtained remainder being used as a serial number of the sub-file finally, writing the data record into the sub-file corresponding to the serial number; the embodiment of the present invention employing the MD5 algorithm to divide, but those skilled in the art understanding that the embodiment of the present invention may also be realized by other hash algorithms;

(3) The capturing unit 303 is configured to capture corresponding website descriptive information according to a result of website sorting; in particular, the capturing processing unit capturing the corresponding website descriptive information for each sub-file according to the website(s) recorded in the sub-file, generating website descriptive information files by the captured website descriptive information and storing the files.

(4) The storage unit 304 is configured to store the captured website(s) and the corresponding website descriptive information; in particular, the storage unit 304 temporarily stores each website descriptive information file, and gathers a plurality of the website descriptive information files to store in the cloud storage medium.

(5) The query processing unit 305 is configured to query the stored websites and the corresponding website descriptive information according to the keyword(s) in a query request when receiving the query request from outside and returning a query result.

The query processing unit may particularly comprise: an index building module 3051, a query module 3052, a result filtering module 3053 and a load balancing module 3054, wherein, the index building module 3051 is configured to build an index according to the websites and the corresponding website descriptive information and create an index file;

the query module 3052 is configured to call the index file to query according to the keyword(s) in the query request and output the query result; wherein, the keyword comprises a website keyword and/or a descriptive keyword, and the query module is particularly configured to judge whether the keyword in the query request is the website keyword or the descriptive keyword, if it is the website keyword, then call the index file to query and output after filtering out the result not hit by a prefix; if it is the descriptive keyword, then directly calling the index file to query and output;

the result filtering module 3053 is configured to, after filtering the query result, output one or more websites whose frequency ranks on the top in the query result as the recommended items, wherein the method of filtering is selected from one or more of the following:

Black and White List filtering, erotic content filtering, Trojan virus type filtering, phishing type filtering and politically sensitive information filtering, etc;

the load balancing module 3054 is configured to perform load balancing on the received query request after receiving the query request from the requestor.

Finally, a device for processing website statistics and a query device according to the embodiment of the present invention will be described in detail in conjunction with FIGS. 4 and 5.

Figure 4:
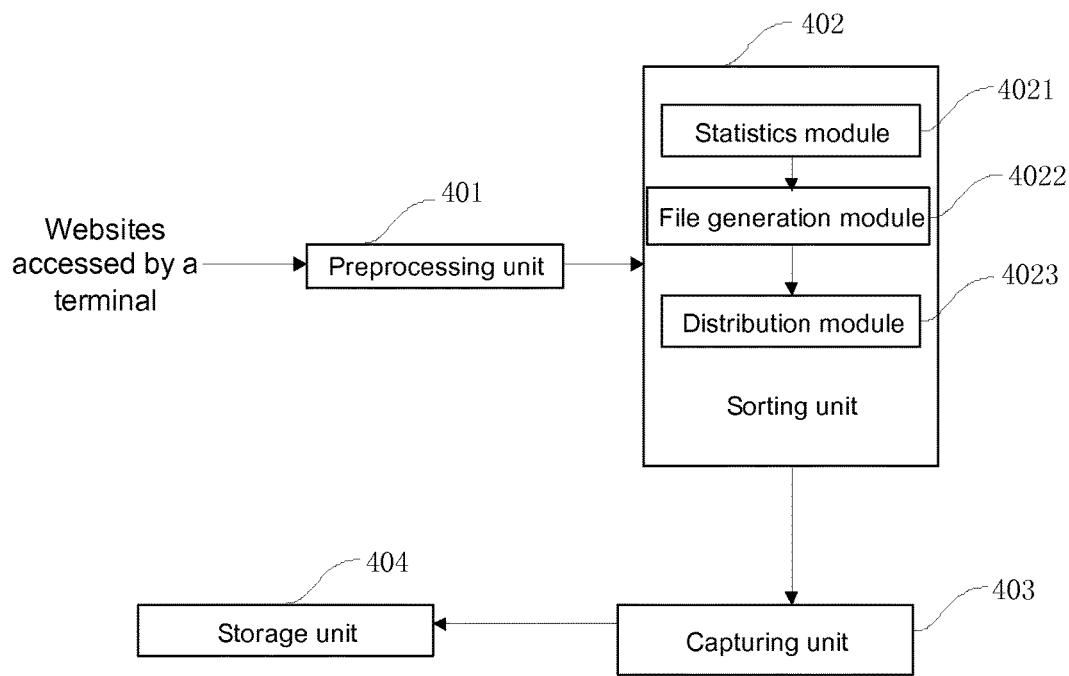
FIG. 4 is a structural diagram of a device for processing website statistics according to an embodiment of the present invention.

As shown in FIG. 4, FIG. 4 is a structural diagram of a device for processing website statistics according to an embodiment of the present invention. The device for processing website statistics may particularly comprise: a preprocessing unit 401, a sorting unit 402, a capturing unit 403 and a storage unit 404, wherein, (1) the preprocessing unit 401, as a preferred functional module according to the embodiment of the present invention, is mainly used for extracting websites from a database storing the websites accessed by a terminal and preprocessing the extracted websites and trigger the sorting unit 402, wherein, the preprocessing comprises: filtering illegal website(s) and/or deleting repeated website(s).

(2) the sorting unit 402 is mainly used for sorting the websites according to the accessed frequency by the terminal.

The sorting unit 402 may particularly comprise: a statistics module 4021, a file generation module 4022 and a distribution module 4023, wherein, the statistics module 4021 is configured to perform statistics on the accessed frequency by the terminal and sort the websites in a from-high-to-low sequence of the accessed frequency;

the file generation module 4022 is configured to generate an original seed file with designated format by the sorted websites, the original seed file containing a plurality of data records, each of which corresponds to one website;

the distribution module 4023 is configured to divide the original seed file into a plurality of sub-files according to a predefined rule to respectively distribute to each capturing unit; wherein, the predefined rule may be MD5 algorithm, the distribution module using the MD5 algorithm to calculate a MD5 value corresponding to a string of websites for each data record in the original seed file; then normalizing the MD5 value to an integer value and using the integer value to calculate a remainder of a number of sub-files to be divided into, the obtained remainder being used as a serial number of the sub-file; finally, writing the data record into the sub-file corresponding to the serial number; the embodiment of the present invention employing the MD5 algorithm to divide, but those skilled in the art understanding that the embodiment of the present invention may also be realized by other hash algorithms;

(3) the capturing unit 403 is configured to capture corresponding website descriptive information according to a result of website sorting; in particular, the capturing unit captures the corresponding website descriptive information for each sub-file according to the websites recorded in the sub-file, generates website descriptive information files by the captured website descriptive information and stores the files; and (4) the storage unit 404 is configured to store the captured websites and the corresponding website descriptive information; in particular, the storage unit temporarily stores website descriptive information file, and gathers a plurality of the website descriptive information files to store in the cloud storage medium.

Figure 5:
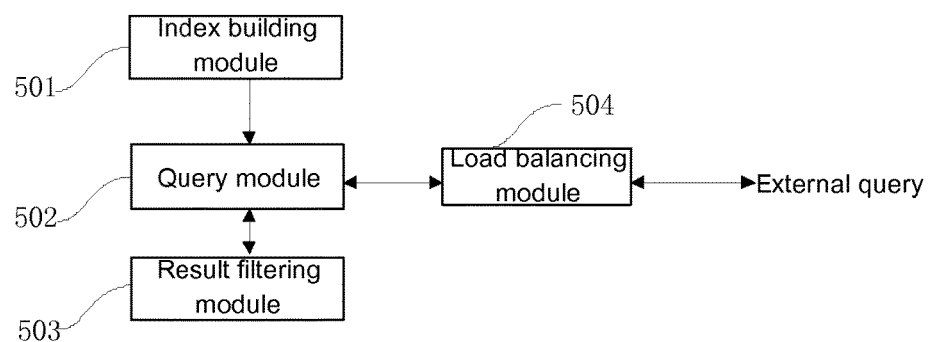
FIG. 5 is a structural diagram of a query device according to an embodiment of the present invention.

As shown in FIG. 5, FIG. 5 is a structural diagram of a query device according to the embodiment of the present invention. The query device may particularly comprise: an index building module 501, a query module 502, a result filtering module 503 and a load balancing module 504, wherein, the index building module 501 is configured to build an index according to the website(s) and the corresponding website descriptive information, and create an index file;

the query module 502 is configured to call the index file(s) to query according to the keyword(s) in the query request and output the query result; wherein, the keyword comprises a website keyword and/or a descriptive keyword, then the query module is particularly configured to judge whether the keyword in the query request is the website keyword or the descriptive keyword, if it is the website keyword, then call the index file to query and output after filtering out the result not hit by a prefix; if it is the descriptive keyword, then directly calling the index file to query and output;

the result filtering module 503 is configured to, after filtering the query result, output one or more websites whose frequency ranks on the top in the query result as the recommended item(s), wherein the method of filtering is selected from one or more of the following:

Black and White List filtering, erotic content filtering, Trojan virus type filtering, phishing type filtering and politically sensitive information filtering, etc;

the load balancing module 504 is configured to perform load balancing on the received query request after receiving the query request from the requestor.

In summary, the embodiments of the present invention provide a method, system and the related equipment for recommending cloud websites based on terminal access statistics. On the basis of the existing cloud websites recommendation, the present invention uses websites actually accessed by massive amounts of terminals as a website library, calculates the popularity of websites and sorts the websites based on the statistics about access behaviors, thereby significantly improving the quality and relevance of the recommended result.

Each member embodiment of the present invention can be realized by hardware, or realized by software modules running on one or more processors, or realized by the combination thereof. A person skilled in the art should understand that a microprocessor or a digital signal processor (DSP) may be used in practical use to realize some or all the functions of some or all the members of the system for filtering keyword(s) according to the embodiments of the present invention. The present invention may be further realized as some or all the equipments or device programs for executing the methods described herein (for example, computer programs and computer program products). Such a program for realizing the present invention may be stored in computer readable medium, or may have one or more signal forms. These signals may be downloaded from the Internet website, or be provided by carrying signals, or be provided in any other manners.

Figure 6:
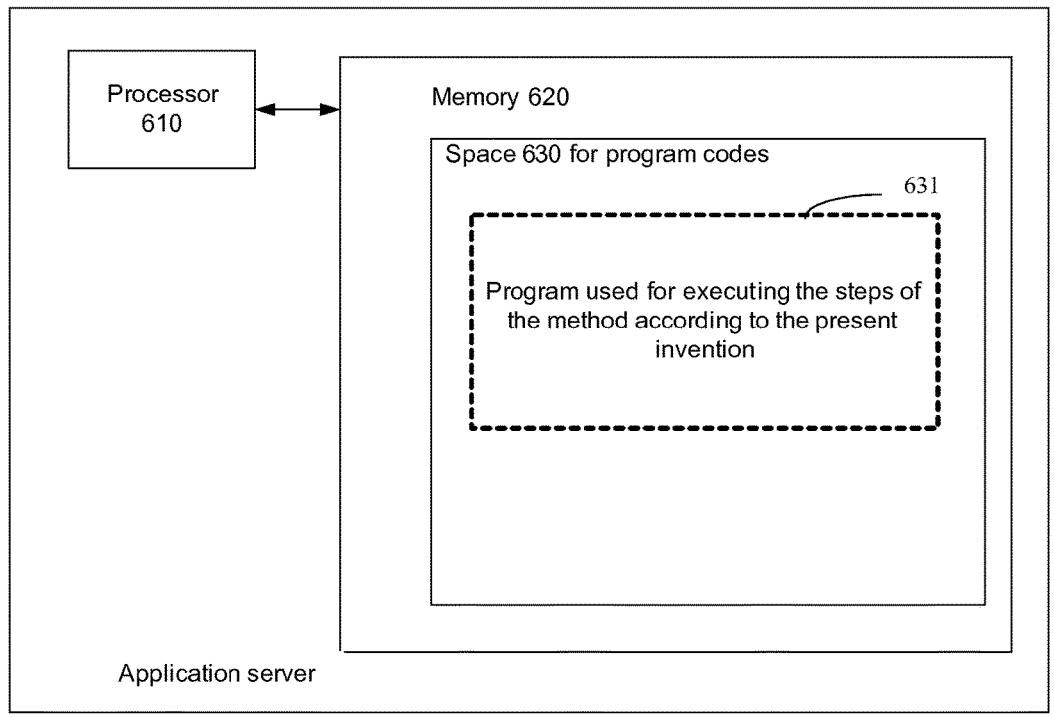
FIG. 6 schematically shows a block diagram of a server used to execute the method according to the present invention.
Figure 7:
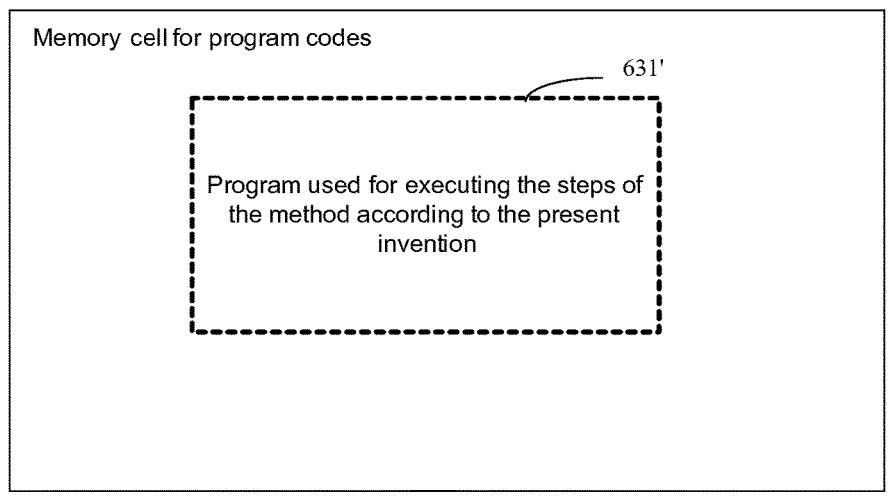
FIG. 7 schematically shows a memory cell used to store or carry program codes for realizing the method according to the present invention.

For example, FIG. 6 shows a server which may realize the method of website recommendation based on terminal access statistics according to the present invention, such as an application server. The server traditionally comprises a processor 610 and a computer program product or a computer readable medium in form of a memory 620. The memory 620 may be electronic memories such as flash memory, EEPROM (Electrically Erasable Programmable Read-Only Memory), EPROM, hard disk or ROM. The memory 620 has a memory space 630 for executing program code 631 of any methodic steps of the above method. For example, the memory space 630 for program code may comprise various program codes 631 of respective steps for realizing the above mentioned method. These program codes may be read from or written into one or more computer program products. These computer program products comprise program code carriers such as hard disk, compact disk (CD), memory card or floppy disk. These computer program products are usually the portable or stable memory cells as shown in reference FIG. 7. The memory cells may have memory sections, memory spaces, etc., which are arranged similarly to the memory 620 in the server as shown in FIG. 6. The program codes may be compressed in an appropriate manner. Usually, the memory cell includes computer readable codes 631', i.e., the codes can be read by processors such as 610. When the codes are operated by the server, the server may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of present invention may be implemented without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets form no limit to the claims. The wording "comprising" is not meant to exclude the presence of elements or steps not listed in a claim. The wording "a" or "an" in front of element is not meant to exclude the presence of a plurality of such elements. The present invention may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as names.

Also, it should be noticed that the language used in the present specification is chosen for the purpose of readability and teaching, rather than for the purpose of explaining or defining the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. A system for recommending cloud websites, which comprises:
   a processor; and
   a memory communicatively coupled to the processor and storing instructions that upon execution by the processor cause the system to:
   store website addresses accessed by a terminal, and sort the website addresses according to frequency accessed by the terminal, wherein the instructions that upon execution by the processor cause the system to sort the website addresses according to the frequency accessed by the terminal further comprises instructions that upon execution by the processor cause the system to:
   sort the website addresses in a from-high-to-low sequence based on the frequency accessed by the terminal,
   generate an original seed file with a designated format comprising the sorted website addresses, the original seed file containing a plurality of data records, each of which corresponds to one website address, and
   divide the original seed file into a plurality of sub-files according to a predefined rule, wherein the predefined rule comprises using a MD5 algorithm to calculate a MD5 value for each data record among the plurality of data records and determining a sub-file among the plurality of sub-files into which each data record among the plurality of data records is written;
   capture website descriptive information for each of the plurality of sub-files, the website descriptive information corresponding to website addresses recorded in the each of the plurality of sub-files;
   store the website descriptive information for the each of the plurality of sub-files and corresponding website addresses to a cloud storage medium;
   when receiving a query request, query the website descriptive information and corresponding website addresses according to one or more query keywords in the query request, and return a query result.

2. The system according to claim 1, wherein the memory further storing instructions that upon execution by the processor cause the system to:
   extract website addresses from a database storing the website addresses accessed by the terminal and pre-process the extracted website addresses, the pre-processing comprising: filtering illegal website addresses or deleting repeated website addresses.

3. The system according to claim 1, wherein, the predefined rule further comprises
   normalizing the MD5 value to an integer value;
   using the integer value to calculate a remainder of a number of sub-files to be divided into, the obtained remainder being used as a serial number of the sub-file; and
   writing the data record into the sub-file corresponding to the serial number.

4. The system according to claim 3, wherein, the instructions that upon execution by the processor cause the system to capture website descriptive information further comprises instructions that upon execution by the processor cause the system to:
   generate website descriptive information files comprising the captured website descriptive information; and
   store the website descriptive information files.

5. The system according to claim 4, wherein, the instructions that upon execution by the processor cause the system to store the website descriptive information and corresponding website addresses to a cloud storage medium further comprises instructions that upon execution by the processor cause the system to:
   temporarily store each website descriptive information file, and gather a plurality of the website descriptive information files to store in the cloud storage medium.

6. The system according to claim 5, wherein, the instructions that upon execution by the processor cause the system to query the website descriptive information and corresponding website addresses further comprises instructions that upon execution by the processor cause the system to:
   build an index according to the website descriptive information and corresponding website addresses, and create an index file;
   call the index file to query according to the one or more query keywords in the query request, output the query result, and return one or more websites whose frequency ranks on the top in the query result as the recommended items.

7. The system according to claim 6, wherein, the instructions that upon execution by the processor cause the system to query the website descriptive information and corresponding website addresses further comprises instructions that upon execution by the processor cause the system to:
   filter the query result, wherein the method for filtering results is selected from one or more of the following: Black and White List filtering, erotic content filtering, Trojan virus type filtering and phishing type filtering.

8. The system according to claim 6, wherein, the instructions that upon execution by the processor cause the system to query the website descriptive information and corresponding website addresses further comprises instructions that upon execution by the processor cause the system to:
perform load balancing on the received query request after receiving the query request.

9. A method for recommending cloud websites, comprising:
storing website addresses accessed by a terminal, and sorting the website addresses according to frequency accessed by the terminal, wherein the sorting the website addresses further comprises:
sorting the website addresses in a from-high-to-low sequence based on the frequency accessed by the terminal,
generating an original seed file with a designated format comprising the sorted website addresses, the original seed file containing a plurality of data records, each of which corresponds to one website address, and
dividing the original seed file into a plurality of sub-files according to a predefined rule, wherein the predefined rule comprises using a MD5 algorithm to calculate a MD5 value for each data record among the plurality of data records and determining a sub-file among the plurality of sub-files into which each data record among the plurality of data records is written;
capturing website descriptive information for each of the plurality of sub-files, the website descriptive information corresponding to website addresses recorded in the each of the plurality of sub-files;
storing the website descriptive information for the each of the plurality of sub-files and corresponding website addresses to a cloud storage medium; and
when receiving a query request, querying the website descriptive information and corresponding website addresses according to one or more query keywords in the query request, and returning a query result.

10. The method according to claim 9, wherein, before the sorting the website addresses, the method further comprises:
extracting website addresses from a database storing the website addresses accessed by the terminal and pre-processing the extracted website addresses, the pre-processing comprising: filtering illegal website addresses or deleting repeated website addresses.

11. The method according to claim 9, wherein, the predefined rule further comprises:
normalizing the MD5 value to an integer value;
using the integer value to calculate a remainder of a number of sub-files to be divided into, the obtained remainder being used as a serial number of the sub-file; and
writing the data record into the sub-file corresponding to the serial number.

12. The method according to claim 9, wherein, the capturing further comprises:
generating website descriptive information files comprising the captured website descriptive information and storing the files.

13. The method according to claim 9, wherein, after the capturing the web site descriptive information, the method further comprises:
gathering and storing a plurality of the website descriptive information files; and
building an index according to the website descriptive information and corresponding website addresses, and creating an index file.

14. The method according to claim 13, wherein, the querying according to the query keyword(s) further comprises:
calling the index file to query according to the one or more query keywords in the query request; and
outputting the query result.

15. The method according to claim 14, wherein, before the outputting the query result, the method further comprises:
filtering the query result;
wherein, the method of filtering results is selected from one or more of the following:
Black and White List filtering, erotic content filtering, Trojan virus type filtering and phishing type filtering.

16. The method according to claim 9, wherein, the method further comprises:
performing load balancing on the received query request after receiving the query request.

17. A non-transitory computer readable medium having instructions stored thereon that, when executed by at least one processor, cause the at least one processor to execute operations, the operations comprising:
storing website addresses accessed by a terminal, and sorting the website addresses according to frequency accessed by the terminal, wherein the sorting the website addresses further comprises:
sorting the website addresses in a from-high-to-low sequence based on the frequency accessed by the terminal,
generating an original seed file with a designated format comprising the sorted website addresses, the original seed file containing a plurality of data records, each of which corresponds to one website address, and
dividing the original seed file into a plurality of sub-files according to a predefined rule, wherein the predefined rule comprises using a MD5 algorithm to calculate a MD5 value for each data record among the plurality of data records and determining a sub-file among the plurality of sub-files into which each data record among the plurality of data records is written;
capturing website descriptive information for each of the plurality of sub-files, the website descriptive information corresponding to website addresses recorded in the each of the plurality of sub-files;
storing the website descriptive information for the each of the plurality of sub-files and corresponding website addresses to a cloud storage medium; and
when receiving a query request, querying the website descriptive information and corresponding website addresses according to one or more query keywords in the query request, and returning a query result.

* * * * *